June 17, 1969    H. G. BOCCKINO ET AL    3,450,804
METHOD OF PRILLING UREA
Filed Jan. 5, 1967
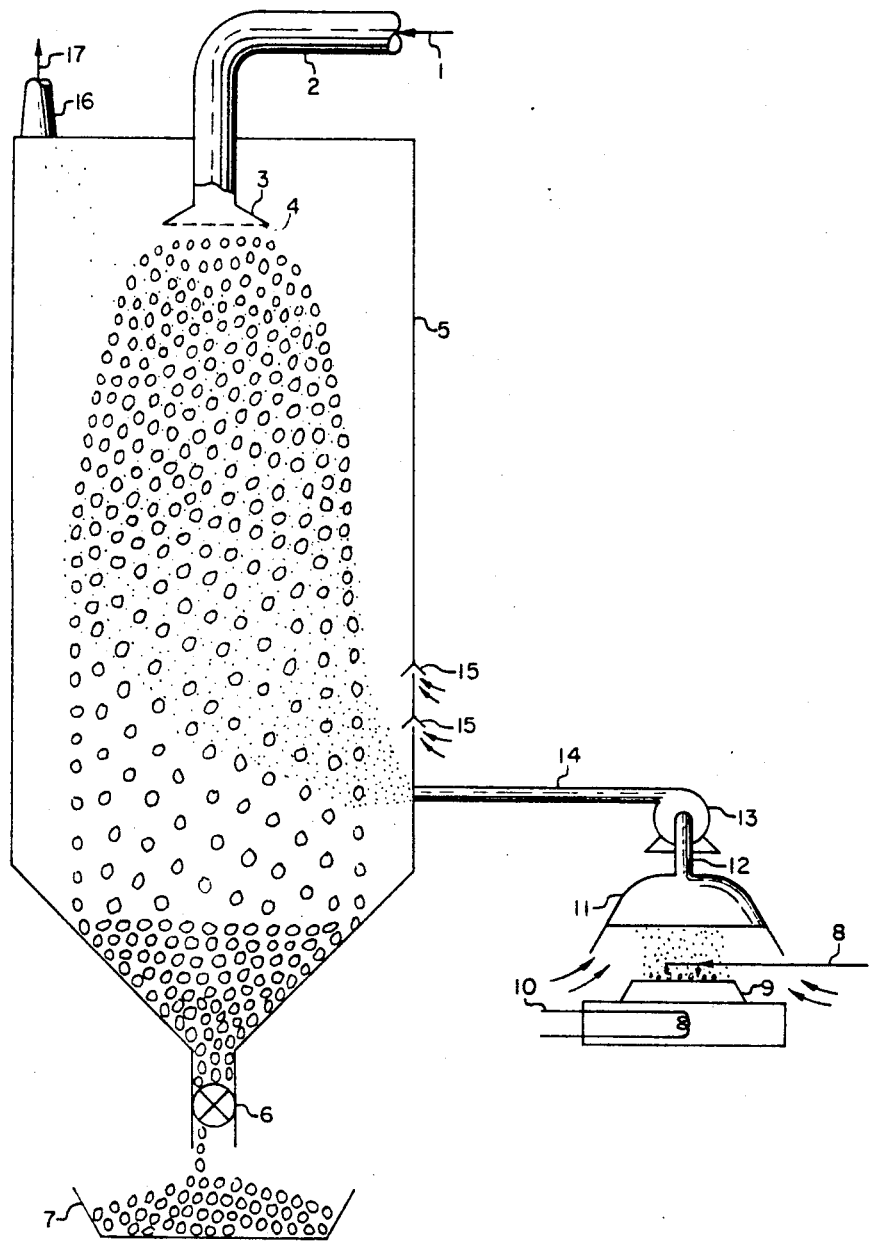
HARRY G. BOCCKINO
THOMAS J. DILLON
JOHN F. VILLIERS-FISHER
INVENTORS
BY J. J. Chaberty
AGENT

# United States Patent Office 3,450,804
Patented June 17, 1969

3,450,804
METHOD OF PRILLING UREA
Harry G. Bocckino, Somerville, Thomas J. Dillon, Elizabeth, and John F. Villiers Fisher, Kendall Park, N.J., assignors to Chemical Construction Corporation, New York, N.Y., a corporation of Delaware
Filed Jan. 5, 1967, Ser. No. 607,433
Int. Cl. B22d 23/08
U.S. Cl. 264—14       4 Claims

ABSTRACT OF THE DISCLOSURE

Anhydrous molten urea is prilled by spraying urea droplets in a solidification zone through which air is circulated, and a dispersion of finely divided solid particles is maintained within the solidification zone, so that the droplets solidify without substantial supercooling and thus have reduced content of absorbed water.

BACKGROUND OF THE INVENTION

Field of the invention

The present invention relates to an improved method of prilling molten anhydrous urea, so as to produce solid prills substantially free of absorberd water. It has been determined that when a dispersion of finely divided solid particles, such as the fog produced by heating urea on a high temperature solid surface, is maintained within the solidification zone such as a prilling tower, the formation of solid urea prills from the liquid droplets takes place without substantial super cooling, and thus the solid prills have a reduced content of absorbed water and are substantially anhydrous.

DESCRIPTION OF THE PRIOR ART

The solidifying of molten urea in the form of discrete spherical particles known as prills is a widely practiced commercial procedure. In the prilling sequence as generally carried out in commercial installations, molten anhydrous urea melt is dispersed or sprayed downwards into a solidification zone in the form of liquid droplets, while air is circulated through the zone so as to provide a cooling effect, so that the droplets solidify in the form of individual spheres, which are recovered as product prills from the bottom of the solidification zone. Details of several prilling procedures are described in U.S. Patents Nos. 3,130,225, 3,059,280, 2,712,557 and 1,977,628. One of the problems encountered in conventional prilling practice is the pickup and absorption of water vapor from the air, which penetrates into the liquid droplets and causes a caking tendency in the resultant solid prills. A method of partially avoiding moisture absorption consists in granulating the urea, by spraying the molten urea into a bed of solid particles with concomitant mixing. This procedure does not produce solid urea in the free-flowing prill form which is most desired for fertilizer usages. Various granulating procedures are described in U.S. Patents Nos. 2,979,421, 2,933,527, 2,933,526 and 2,815,376. Another prior art urea solidification practice, such as described in U.S. Patent No. 2,887,723 and French Patent No. 665,512, consists of dispersing the liquid urea into a body of cold liquid which is immiscible with the urea. The resulting granular solid particles are coated with the immisible liquid, which necessitates further processing to remove the liquid coating.

SUMMARY OF THE INVENTION

In the present invention, molten and substantially anhydrous urea is prilled in a solidification zone, by spraying the urea droplets downwards through the zone while circulating air through the zone. A dispersion of finely divided solid particles is maintained within the solidification zone, and it has been determined that the provision of the solid particles dispersion in the zone produces highly beneficial prilling results, in terms of an improved solid prill product. The prills produced according to the present invention are characterized by a plate-like crystal structure rather than the usual needle structure, and in addition the prills are substantially anhydrous due to the prevention of water absorption during prilling. As mentioned spura, the presence of the dispersion of finely divided solid particles in the prill tower prevents substantial supercooling of the liquid urea droplets, apparently by providing nuclei for crystal formation in each droplet. Thus, since supercooling of the droplets is prevented, solid prill formation takes place at a higher temperature, and condensation or absorption of water vapor on the prill surface is prevented. The result is the production of prills having a low moisture content and characterized by a plate-like crystal structure.

The dispersion of finely divided solid particles may be maintained in the solidification zone of the prilling tower by a variety of procedures. The solid particles are preferably in the colloidal state, and will usually be added to the air stream which is circulated through the prilling tower for cooling purposes as described supra. In other instances, the solid particles may be introduced into the prilling tower as a separate material stream, either through the vertical wall of the tower at points of varying elevation, or through the bottom of the tower. The solid particles may consist of any suitable material capable of being reduced to a fine powder, dust or colloidal form, such as Petro-Ag, limestone, or other fertilizer materials such as ammonium sulphate. A preferable material for use as the solid particles consists of urea itself or solid urea decomposition products such as melamine, isocyanic acid and cyanuric acid. As will appear infra, optimum results are obtained by producing the dispersion of finely divided solid particles by a novel procedure, in which solid urea is heated on a high temperature solid surface such as a red hot plate which is at a temperature of about 500° C. or higher. In this procedure, a fog of urea decomposition products is obtained, which is then passed into the prilling tower and rapidly disperses in the circulating air stream.

The principal advantage of the present invention is that extremely low moisture content or substantially anhydrous urea prills are produced, which are substantially non-caking or very resistant to caking even under humid storage conditions. In addition, due to the formation of a plate-like crystal structure in the prills of the present invention rather than the needle crystal structure of the prior art, the prills are harder and less porous, and consequently are more resistant to attrition and crushing during subsequent processing or storage.

It is an object of the present invention to provide an improved method for prilling molten anhydrous urea.

Another object is to produce urea prills of reduced moisture content.

A further object is to substantially prevent the supercooling of molten urea droplets during crystallization.

An additional object is to produce urea prills having a plate-like crystal structure, which have a relatively hard and non-porous form.

Still another object is to produce urea prills which are resistant to moisture absorption, have a reduced caking tendency, and are resistant to attrition and crushing.

Still a further object is to reduce or substantially prevent the absorption or retention of water vapor by molten urea droplets during prilling.

DESCRIPTION OF THE DRAWING AND PREFERRED EMBODIMENTS

These and other objects and advantages of the present invention will become evident from the description which follows. Referring to the figure, a preferred embodiment of the present invention is provided, in which the dispersion of finely divided solid material consists of a fog of urea decomposition products which is added to the air circulating in the prilling tower. Molten and substantially anhydrous urea stream 1 is passed through duct 2 at a temperature above 132.7° C. Duct 2 extends to spray head 3 which consists of a funnel-shaped member provided with a lower foraminous outlet plate having drilled openings or orifices of a size which depends on the size of solid prill which is desired. In some instances spray head 3 may be replaced by other appropriate liquid spraying devices, such as a plurality of spray nozzles. The hot anhydrous liquid urea is sprayed downwards out of the openings in plate 4, and falls downwards through prilling tower 5 as a plurality of discrete liquid droplets. A fog consisting of finely divided solid particles of urea decomposition product is also present in tower 5, and air is circulated upwards through the tower 5 so as to provide a cooling effect and solidify the liquid urea droplets as solid spherical prills. Due to the presence of the fog in tower 5, the liquid urea droplets solidify at a temperature of about 132° C., without substantial supercooling. The resultant solid prills collected in the bottom of tower 5 are discharged via star valve 6 into transport vessel 7 for passage to storage, bagging, or other product utilization.

The fog of urea decomposition products is prepared by passing solid urea stream 8 onto the heated surface of plate 9, which is heated to a red heat of about 500° C. or higher by electrical resistor heating element 10. The urea stream 8 is vaporized as a fog of urea decomposition products by plate 9, and the resultant fog is drawn into hood 11, together with surrounding ambient air, by duct 12. The duct 12 extends to the inlet of blower 13, which discharges the air-fog mixture through duct 14 into the lower part of tower 5, preferably below the solidification zone in which the liquid droplets are cooled and solidify into solid prills. As mentioned supra, a possible mechanism of prill formation is that solid particles of the fog deposit on the surface of the liquid droplets, and provide nuclei for solidification without supercooling. Additional ambient air may be introduced into tower 5 through louvers 15. The residual fog together with warmed air is discharged from tower 5 through upper outlet conduit 16 as stream 17. Conduit 16 may extend to the inlet of an induction or circulation fan or a suitable blower, from which stream 17 is discharged to the atmosphere.

Numerous alternatives within the scope of the present invention, besides those mentioned supra, will occur to those skilled in the art. The process temperature conditions, such as the prill solidification temperature of about 132° C. mentioned supra, constitute merely preferred embodiments of the invention for optimum utilization of the concepts of the present invention. Thus, in some instances, the prills will solidify at somewhat lower temperatures in practice, such as over the range from about 132° C. to 125° C. or lower. As discussed supra, other finely divided solid particles may be employed in tower 5 besides a fog of urea decomposition products. The solid particles may be blown into tower 5 as a dust or powder carried on a stream of air. The air circulation in tower 5 may be downwards from an upper inlet and cocurrent with the falling liquid urea droplets. In this instance, the finely divided solid particles will be added to the system ajacent to or at the upper end of tower 5. Although the louvers 15 have been shown as juxtaposed and immediately above duct 14, in some instances additional louvers may be provided at other sections of tower 5, such as below the level of fog entry via duct 14. A portion or all of the discharged air stream 17 may be cooled and recirculated, in order to minimize the rate of fog generation required.

An example of laboratory testing of the present invention will now be described.

Example

Molten and substantially anhydrous urea was prilled in a laboratory prilling tower which was 8.3 meters in height. The tower was provided with a spray head containing an orifice diameter of 0.025 centimeter. Air was circulated upwards through the tower at the rate of 38.2 standard cubic meters per hour.

Following are the results obtained with representative test runs, employing an initial urea melt to which variable small amounts of water were added. In runs #1–5, the tower was operated without the presence of any internal dispersion of finely divided solid particles, while in runs #6–11, the tower was operated with an internal dispersion of a fog of urea decomposition products obtained as described supra. It is apparent from the results obtained, in terms of moisture content of the urea prills, that a substantial reduction in absorbed moisture content is obtained when the internal fog is provided in the tower.

|  | Tower temp., ° C. | | | Percent moisture in urea | | |
|---|---|---|---|---|---|---|
| Run No. | Bottom | Top | Dew point | Initial melt | Final prill | Remarks |
| Micro prills: | | | | | | |
| 1 | 44 | 53 | 79 | 0.472 | 1.078 | No fog. |
| 2 | 39 | 80 | 79 | 0.141 | 1.52 | Do. |
| 3 | 40 | 81 | 82 | 0.482 | 0.810 | Do. |
| 4 | 44 | 85 | 84 | 0.519 | 2.33 | Do. |
| 5 | 37 | 86 | 81 | 0.311 | 1.67 | Do. |
| 6 | 56 | 99 | 89 | 0.402 | 0.405 | Fogged. |
| 7 | 72 | 95 | 92 | 0.345 | 0.345 | Do. |
| 8 | 54 | 61 | 93 | [1] 0.218 | 0.409 | Do. |
| Fertilizer grade prills: | | | | | | |
| 9 | 109 | 138 | 78 | 0.817 | 0.462 | Do. |
| 10 | 108 | 120 | 79 | 0.876 | 0.414 | Do. |
| 11 | 100 | 104 | 81 | 0.762 | 0.542 | Do. |
| Tower memory: | | | | | | |
| 12 | 100 | 104 | 81 | .762 | .542 | Do. |
| 13 | 100 | 106 | 78 | 1.01 | .626 | No fogging. |
| 14 | 100 | 100 | 81 | .890 | .358 | Do. |
| 15 | 96 | 99 | 76 | .669 | .419 | Do. |
| 16 | 102 | 102 | 78 | .529 | .584 | Do. |
| 17 | 102 | 102 | 76 | .742 | .97 | Do. |

[1] Initial melt made up to 0.4 moisture.

Runs 13 through 17 were made consecutively without additional fume added during the runs. The resulting low moistures may be due to a crystal structure memory, recirculating dust etc., or residual fume remaining from run 12.

We claim:

1. A method of prilling urea in which molten substantially anhydrous, urea is sprayed downwardly through a gaseous solidification zone as droplets; flowing an air stream upwardly through said zone whereby said droplets are cooled and solifified in said zone without supercooling, and are collected as anhydrous prills at the bottom of said zone, the improvement comprising: passing a dispersion of finely divided solid particles in said air stream in and through said zone, said dispersion being produced by adding said solid particles to said air stream prior to flowing said dispersion into said zone.

2. The method of claim 1, in which said solid particles are of colloidal form.

3. The method of claim 1, in which said finely divided solid particles consist of solid material selected from the group consisting of solid urea, urea decomposition products, and melamine.

4. The method of claim 1, in which said dispersion of finely divided solid particles is produced by heating solid urea on a high temperature solid surface to produce a fog of urea decomposition products, and said fog is passed into said solidification zone.

References Cited
UNITED STATES PATENTS 3,001,228  9/1961  Nack.
3,025,571  3/1962  Beecher et al. _____ 264—13

ROBERT F. WHITE, *Primary Examiner.*

J. R. HALL, *Assistant Examiner.*